Jan. 30, 1968  R. G. HOLZ ET AL  3,365,934
APPARATUS FOR DETERMINING THE DEFORMATION
AMPLITUDE OF A MOVING COMPONENT MADE OF
AN ELECTRICALLY CONDUCTIVE MATERIAL
Filed May 12, 1965
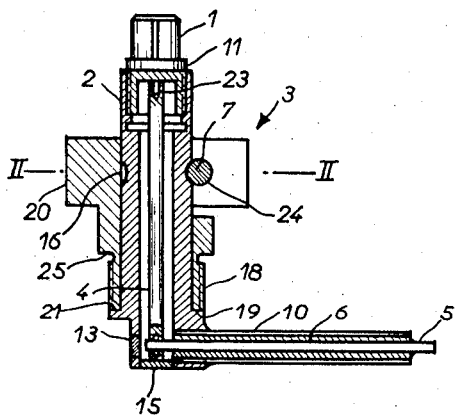
Fig.: 1
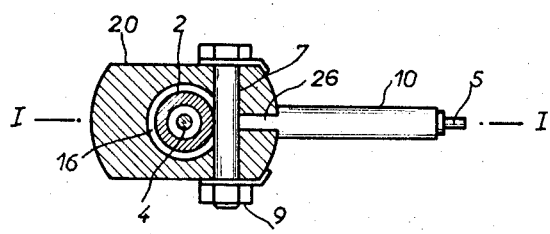
Fig.: 2
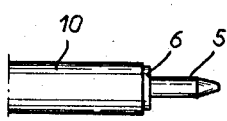
Fig.: 3
INVENTORS
Robert Gustave Holz and
Daniel Eugene Orsi
By
Watson, Cole, Grindle and Watson
ATTORNEYS

United States Patent Office 3,365,934
Patented Jan. 30, 1968

3,365,934
APPARATUS FOR DETERMINING THE DEFORMATION AMPLITUDE OF A MOVING COMPONENT MADE OF AN ELECTRICALLY CONDUCTIVE MATERIAL
Robert Gustave Holz, Draveil, and Daniel Eugène Orsi, Paris, France, assignors to Societe Nationale D'Etude et de Construction de Moteurs D'Aviation, Paris, France, a company of France
Filed May 12, 1965, Ser. No. 455,122
Claims priority, application France, May 12, 1964, 974,178
7 Claims. (Cl. 73—70)

ABSTRACT OF THE DISCLOSURE

A system for determining the amplitude of the deformation or vibration of blades of a rotating member made of an electrically conducting material, by arranging close to the path normally followed by the blades a stationary member made of a soft, electrically conducting material capable of being abraded by the material of the blades, and by electrically ascertaining the contact between the stationary member and the blades.

---

Generally, multi-stage axial flow compressors are not designed for operation below a certain speed and if the compressor is operated below such speed stalling results with periodic excitation of the blades. Also, critical speeds may result in fluctuating vibration.

Although machines are designed to reduce as far as possible any risk of dangerous vibration, geometric deviations due to machining and assembly tolerances cause some diversity in behaviour both as regards configuration, frequency and intensity of the exciter phenomena and as regards receptivity and damping of the excited elements.

Before a gas turbine is put to work, therefore, it is sometimes necessary to ensure that the level of vibration of some of the blades which are particularly exposed to such vibration should be acceptable.

The systematic application of such inspection requires simple means which can be rapidly used.

The present invention relates to a system which enables such inspection to be carried out in cases in which the geometric features of the blades under inspection enable the displacement at the blade tip to be utilised for interpretation of the stress with a suitable degree of accuracy.

The system according to the invention particularly permits the following:

(1) Determination of the most critical range of operation, i.e., the speed at which amplitudes are at a maximum;

(2) Calculation of the value of the maximum amplitude;

(3) Determination of blades having the highest amplitude.

The system has the advantage of checking all the blades without exception and of being independent of the material from which they are made, the only proviso being that they should be made of an electrically conductive material.

The system according to the invention comprises:

(1) A feeler whose end is situated in the path of the deformed part of the moving component and which is of a soft material which can be abraded by the component and which is also an electrical conductor;

(2) An electric circuit comprising the component, the feeler and a contact detector.

The feeler may, for example, be made of graphite in the form of a graphite rod disposed in the feeler after the style of the graphite rod in a pencil.

The feeler is embedded so as to be insulated from earth and by the use of fixing and adjustment means adapted to access possibilities, in the compressor stator near the leading edge of the blading under inspection. The electric circuit comprises a sensitive detector adapted to detect contacts of a duration of less than a microsecond between the blades and the feeler. The bistable circuit principle, which is well known in electronics, has been found very suitable for this use.

Operation is as follows:

Under the effect of vibration, the vibrating blade emerges from its normal plane of rotation and comes into contact with the feeler. This very short contact is converted to a continuous light or acoustic signal by the use of the bistable circuit. The operator then presses a button to re-set the bistable circuit to the ready position as soon as the signal is perceived or recorded.

The contact between the leading edge of the blades and the feeler is repeated at high frequency and will produce abrasion of the feeler corresponding to the maximum amplitude reached.

Also, the blades which have caused such abrasion will be marked by the graphite.

After the machine has been stopped, appropriate means (keys, gauges etc.) are used to determine the amount of abrasion of the feeler or the play between the leading edge of a reference blade and the feeler.

This value will be interpreted by predetermined relationships between the stress and the axial amplitude at the blade tip (taking into account centrifugal stiffening under contact conditions), static influences (expansion of casings and bearing play) and any faults in the alignment of the leading edges of the various blades of the movable blading under inspection.

The accompanying drawing diagrammatically illustrates one embodiment of a feeler forming part of the system according to the invention.

FIG. 1 is a longitudinal section on the line I—I in FIG. 2.

FIG. 2 is a cross-section on the line II—II in FIG. 1, and

FIG. 3 shows the feeler end.

The feeler shown in the drawing comprises two hollow perpenditcular arms 2 and 10. Arm 2 has a larger diameter than arm 10. An insulating bush 11 is screwed into the free end of arm 2. Bush 11 bears a pin 1 which can be connected to an electrical conductor and has on the inside a lug 23 penetrating into the hollow end of a conductive rod 4 occupying the hollow central part of the arm 2.

The arm 2 is formed with an aperture 13 on the axis of the duct inside the arm 10 and the same applies to rod 4. A circular groove 16 is formed on the outer surface of the arm 2, which also has a shoulder 19 near the arm 10.

Arm 10 contains an insulating sheath 6 into which a graphite rod 5 is introduced via aperture 13 and the aperture in the rod 4, and the graphite rod may be copper-plated and tin-plated at the end entering the aperture in the rod 4 in order to facilitate electric connection by welding to the rod 4 when the graphite rod 5 has been introduced into the aperture in said rod 4. An aperture may be formed at 15 at the end of the arm 2 and on the axis of such arm to facilitate operations. Aperture 13 in arm 2 is then closed with synthetic rubber which polymerises in air and aperture 15 in arm 2 is closed by an insulating disc which at the same time secures the end of rod 4. The free bare end of the graphite rod projecting from the arm 10 (FIG. 3) is sharpened. The support 3 is secured on the arm 2 and has a shoulder 21 which abuts the shoulder 19. The collar 20 of this support is formed with a transverse slot 26 between a bore 24 and the outer edge of said support. A bolt 7 extends through the bore 24 and penetrates tangentially into the groove 16 and a nut 9 screwed on the bolt 7 enables the arm 2 of the feeler to be rigidly clamped in the support 3 after the arm 10 has been set to the required direction. The support 3 also has an outer screw-threaded part 18.

To inspect a compressor by means of this feeler, the plug which closes the screwthreaded aperture in the compressor casing is first removed. The arm 10 of the feeler is then introduced carefully inside the casing of the compressor and the support 3 is secured to this casing instead of the plug by the screwthreaded part 18 being screwed into the casing aperture until abutment of the shoulder 25.

The accessible part of the arm 2 is turned manually until the arm 10 is in the required position with respect to the blades in a free path, and this position is secured by locking nut 9 on bolt 7.

The compressor can then be turned to check the deformation of the movable blading near which the feeler has been disposed, as indicated above.

What we claim is:

1. A system for determining the amplitude of the deformation that a moving component of an electrically conductive material undergoes as a result of stresses produced by such movement, such system comprising a feeler whose end is in the path of the deformed or vibrating part of the moving component, said end being made of a soft material adapted to be abraded by the component and also electrically conductive.

2. A system according to claim 1, further comprising an electric circuit which includes said component, said feeler end, and a contact detector.

3. A system according to claim 1, where said soft material is graphite.

4. A system according to claim 1, wherein said moving component belongs to a machine having a stationary part, said system further comprising a support for the feeler material which is electrically insulated therein, and means for securing the support to the stationary part of the machine.

5. A system according to claim 4, wherein for inspection of rotary components, the support has two perpendicular arms, one of which contains the feeler and is disposed in the machine near the rotary component, while the other arm is used for securing the feeler to the stationary part of the machine.

6. A system according to claim 5, wherein the arm containing the feeler is adjustable around the axis of the other arm before said other arm secures the feeler to the stationary part of the machine.

7. A system according to claim 5, wherein the rotary components are turbomachine rotor blades.

References Cited

FOREIGN PATENTS 1,109,570   8/1955   France.

RICHARD C. QUEISSER, *Primary Examiner.*

JAMES GILL, *Examiner.*

JOHN P. BEAUCHAMP, *Assistant Examiner.*